US010992584B2

(12) United States Patent
Zhou et al.

(10) Patent No.: US 10,992,584 B2
(45) Date of Patent: Apr. 27, 2021

(54) PROCESSING PACKET

(71) Applicant: NEW H3C TECHNOLOGIES CO., LTD., Hangzhou (CN)

(72) Inventors: Ying Zhou, Beijing (CN); Wen Wu, Beijing (CN); Yuelei Chao, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 0 days.

(21) Appl. No.: 16/474,037

(22) PCT Filed: Dec. 26, 2017

(86) PCT No.: PCT/CN2017/118627
§ 371 (c)(1),
(2) Date: Jun. 26, 2019

(87) PCT Pub. No.: WO2018/121528
PCT Pub. Date: Jul. 5, 2018

(65) Prior Publication Data
US 2019/0372899 A1 Dec. 5, 2019

(30) Foreign Application Priority Data
Dec. 26, 2016 (CN) .......................... 201611220634.3

(51) Int. Cl.
*H04L 12/819* (2013.01)
*H04L 12/66* (2006.01)
*H04L 29/08* (2006.01)

(52) U.S. Cl.
CPC ............ *H04L 47/215* (2013.01); *H04L 12/66* (2013.01); *H04L 67/02* (2013.01)

(58) Field of Classification Search
CPC ............. H04L 63/1425; H04L 63/1441; H04L 63/145
See application file for complete search history.

(56) References Cited

U.S. PATENT DOCUMENTS 7,639,117 B2 * 12/2009 Wiemeyer .......... G07C 9/00309
235/380
9,722,972 B2 * 8/2017 Ahmed ............... H04L 63/0884
(Continued)

FOREIGN PATENT DOCUMENTS

CN 101018206 A 8/2007
CN 101459583 A 6/2009
(Continued)

OTHER PUBLICATIONS

State Intellectual Property Office of the People's Republic of China, Office Action and Search Report Issued in Application No. 201611220634.3, dated Mar. 27, 2020, 11 pages. (Submitted with Machine Translation).
(Continued)

*Primary Examiner* — Parth Patel
*Assistant Examiner* — Berhanu D Belete
(74) *Attorney, Agent, or Firm* — McCoy Russell LLP

(57) ABSTRACT

A method and device for processing a packet are provided in this disclosure. According to an example of the method, an HTTPS packet is received from a user host, and a non-online user session entry matching the HTTPs packet is searched for according to a source IP address and a destination IP address of the HTTPS packet. In case that the non-online user session entry is found, a token is obtained from a first token bucket if determining that a user session corresponding to the non-online user session entry has no token, where the number of tokens in the first token bucket is set based on processing capability of a CPU of the access gateway device. When the token is successfully obtained, the HTTPS packet is sent to the CPU for processing. When the token has failed to be obtained, the HTTPS packet is abandoned.

15 Claims, 4 Drawing Sheets

(56) References Cited

U.S. PATENT DOCUMENTS

| | | | |
|---|---|---|---|
| 2002/0063622 A1* | 5/2002 | Armstrong | G08B 13/2417 340/10.31 |
| 2004/0125796 A1* | 7/2004 | Reader | H04L 47/2458 370/359 |
| 2005/0195067 A1* | 9/2005 | Wiemeyer | G07C 9/00309 340/5.7 |
| 2007/0075834 A1* | 4/2007 | Armstrong | G06K 7/10039 340/10.1 |
| 2009/0109867 A1* | 4/2009 | Mangetsu | H04W 24/06 370/252 |
| 2009/0288144 A1* | 11/2009 | Huber | G06Q 20/1235 726/3 |
| 2010/0293275 A1* | 11/2010 | Rezaiifar | H04L 47/14 709/225 |
| 2012/0020420 A1* | 1/2012 | Sakoda | H01Q 3/26 375/259 |
| 2013/0227291 A1* | 8/2013 | Ahmed | H04L 63/0884 713/171 |
| 2014/0026143 A1* | 1/2014 | Suzuki | G06F 9/52 718/104 |
| 2014/0181473 A1* | 6/2014 | Dice | G06F 9/52 712/203 |
| 2015/0106476 A1* | 4/2015 | Hotz | H04L 67/12 709/217 |
| 2016/0044038 A1 | 2/2016 | Kementsietsidis et al. | |
| 2016/0055248 A1* | 2/2016 | Goel | G06F 16/319 707/770 |
| 2016/0087957 A1* | 3/2016 | Shah | H04L 63/08 726/1 |
| 2016/0092666 A1* | 3/2016 | Padilla | G06F 21/6245 726/27 |
| 2016/0197954 A1* | 7/2016 | Luo | H04L 63/1441 726/26 |
| 2016/0248761 A1* | 8/2016 | Talvensaari | H04L 63/068 |
| 2016/0359829 A1 | 12/2016 | Gulledge | |
| 2017/0070533 A1* | 3/2017 | Bailey | H04L 63/0861 |
| 2017/0070534 A1* | 3/2017 | Bailey | H04L 63/1408 |
| 2018/0063152 A1* | 3/2018 | Erich | H04L 63/0853 |

FOREIGN PATENT DOCUMENTS

| | | |
|---|---|---|
| CN | 104270364 A | 1/2015 |
| CN | 104519021 A | 4/2015 |
| JP | 2006013757 A | 1/2006 |

OTHER PUBLICATIONS

ISA State Intellectual Property Office of the People's Republic of China, Written Opinion of the International Search Authority Issued in Application No. PCT/CN2017/118627, dated Mar. 12, 2018, WIPO, 4 pages.

European Patent Office, Extended European Search Report Issued in Application No. 17885544.1, dated Oct. 21, 2019, Germany, 5 pages.

ISA State Intellectual Property Office of the People's Republic of China, International Search Report Issued in Application No. PCT/CN2017/118627, dated Mar. 12, 2018, WIPO, 4 pages.

Japanese Patent Office, Office Action Issued in Application No. 2019-534829, dated Sep. 15, 2020, 7 pages. (Submitted with Machine Translation).

State Intellectual Property Office of the People's Republic of China, Office Action and Search Report Issued in Application No. 201611220634.3, dated Dec. 28, 2020, 4 pages (Submitted with Machine Translation).

* cited by examiner

PROCESSING PACKET

CROSS REFERENCE TO RELATED APPLICATION

This present application is a U.S. National Phase of International Patent Application Serial No. PCT/CN2017/118627 entitled "PROCESSING PACKET," filed on Dec. 26, 2017. International Patent Application Serial No. PCT/CN2017/118627 claims priority to Chinese Patent Application No. 201611220634.3 filed on Dec. 26, 2016. The entire contents of each of the above-cited applications are hereby incorporated by reference for all purposes.

BACKGROUND

Portal authentication is a flexible network access control technique with which a user name and a password of a user may be obtained via a Web page so as to authenticate the identity of the user, thereby achieving the purpose of access control. A user host (or Portal client) may access an external network, such as Internet, by using a HyperText Transfer Protocol (HTTP) or HyperText Transfer Protocol over Secure Socket Layer (HTTPS).

The user host may send an HTTPS packet when accessing the Internet based on the HTTPS. A Broadband Remote Access Server (BRAS) device may determine whether the user is already authenticated after receiving the packet. If the Portal authentication is not performed, the BRAS device may spoof as a Web server accessed by the user host to establish a Transmission Control Protocol (TCP) connection and a Secure Socket Layer (SSL) connection with the user host, and may push a redirecting page to the user host so that the user inputs the user name and the password on the redirecting page.

Subsequently, the BRAS device may interact with a Portal server to complete the Portal authentication of the user by using the user name and the password input by the user. The user can go online after passing the authentication and the user host can access the Internet normally.

DETAILED DESCRIPTION OF THE EMBODIMENTS

Figure 1:
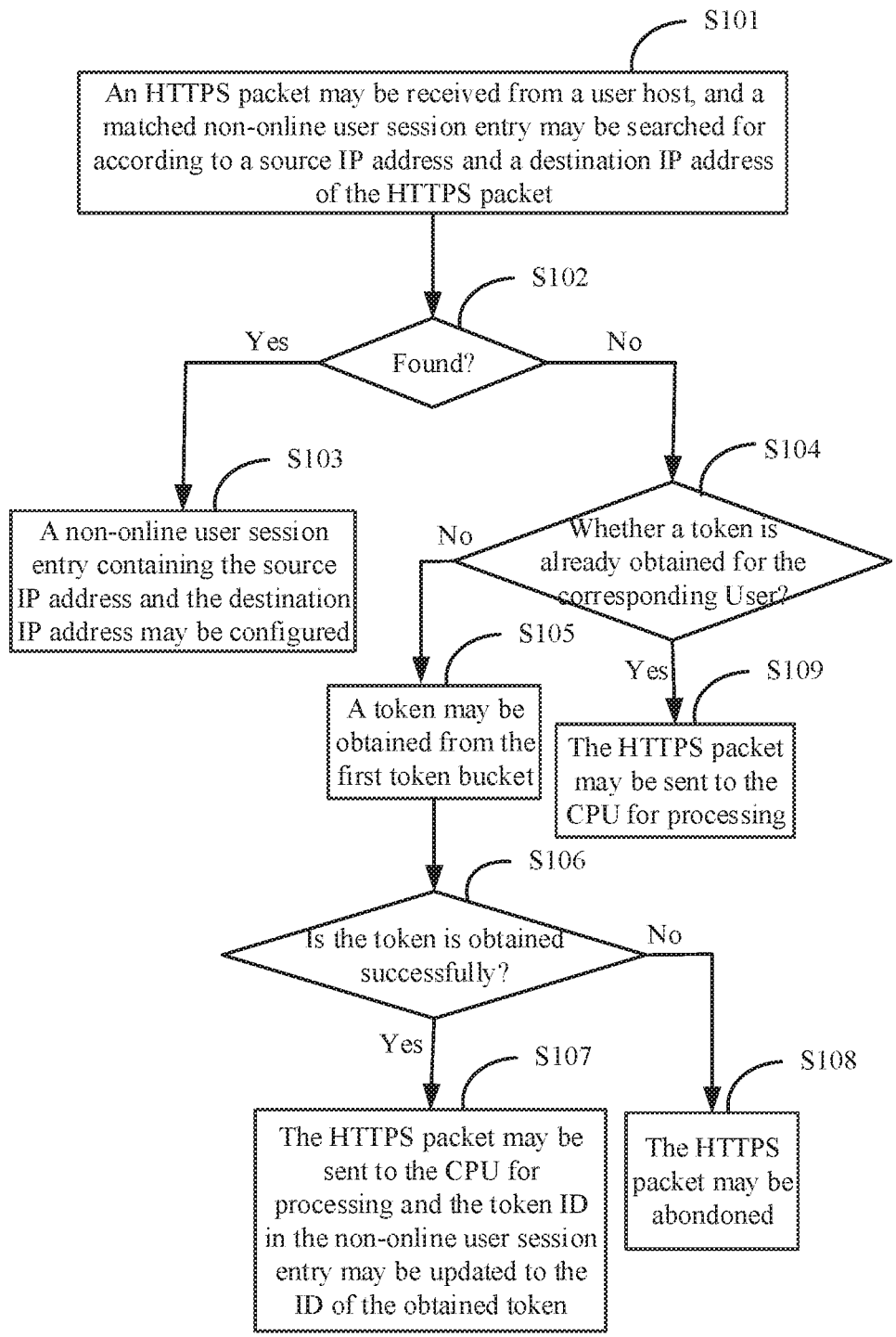
FIG. 1 is a flowchart illustrating a method of processing a packet according to an example of the present disclosure.

The technical solutions of examples of the present disclosure will be described clearly and fully below in combination with drawings in the examples of the present disclosure. It is apparent that the described examples are merely part of examples of the present disclosure rather than all examples. Other examples achieved by those of ordinary skill in the art based on the examples in the present disclosure without paying creative work shall all fall into the scope of protection of the present disclosure.

The terminology used in the present disclosure is for the purpose of describing a particular example only, and is not intended to be limiting of the present disclosure. The singular forms such as "a", "said", and "the" used in the present disclosure and the appended claims are also intended to include multiple, unless the context clearly indicates otherwise. It is also to be understood that the term "and/or" as used herein refers to any or all the possible combinations that include one or more associated recited items.

It should be appreciated that although different information may be described using the terms such as first, second, third, etc. in the present disclosure, these information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

In a TCP spoofing process based on an HTTPS, there may be a lot of interactive packets between a user host and a BRAS device. Thus, the processing burden of a CPU of the BRAS device will increase sharply when lots of users need to go online in a short period of time. Consequently, the device will break down when the processing burden goes beyond a normal processing capability of the CPU. To solve the above problem, a method of processing a packet and a device for processing a packet to which the method may be applied are provided in the following examples of the present disclosure.

According to an example of the present disclosure, the method may be executed by an access gateway device such as a BRAS device. According to the method, the access gateway device may receive an HTTPS packet from a user host. The access gateway device may search for a non-online user session entry matching the HTTPS packet. When the matched non-online user session entry is found, the access gateway device may obtain a token from a first token bucket if determining that no token is obtained for a user session corresponding to the non-online user session entry. The number of tokens in the first token bucket may be set based on the processing capability of the CPU of the access gateway device. The access gateway device may send the HTTPS packet to the CPU for processing when a token is successfully obtained, and abandon the HTTPS packet when a token has failed to be obtained. The first token bucket may be set in a way that the number of tokens in the first token bucket may be set based on the processing capability of the CPU of the access gateway device, and an non-online user session entry may be newly added to record the session information of an non-online user. Thus, the number of HTTPS packets to be sent to the CPU may be restricted so that only the HTTPS packet of the user session for which a token is obtained can be sent to the CPU for processing, and the HTTPS packet of the user session for which no token is obtained will be directly abandoned rather than sent to the CPU for processing. As a result, the number of the HTTP packets to be sent to the CPU can be restricted. In this way, when lots of users need to go online in a short period of time, the processing burden of the CPU of the access gateway device can be reduced, thereby ensuring that the actual load of the CPU does not go beyond the normal processing capability.

In an example, a first token bucket may be preset and a number of tokens in the first token bucket may be set based on processing capability of a CPU of an access gateway device. The larger the processing capability of the CPU is, the more tokens the first token bucket may contain. Now, as shown in FIG. 1, the method of processing a packet executed by the access gateway device includes the following blocks.

At block S101, an HTTPS packet may be received from a user host, and a matched non-online user session entry may be searched for according to a source IP address and a destination IP address of the HTTPS packet.

In an example of the present disclosure, a user session may be identified by a source IP address and a destination IP address, and one non-online user session entry corresponds to one user session.

At block S102, it may be determined whether the matched non-online user session entry is found. If no, block S103 is executed. If yes, block S104 is executed.

At block S103, a non-online user session entry containing the source IP address and the destination IP address may be configured, and then the flow is quit.

Assuming that the source IP address of the HTTPS packet received at block S101 is IP11 and the destination IP address thereof is IP12, the non-online user session entry configured at block S103 may be as shown in table 1:

TABLE 1

| Destination Port Number | Source IP Address | Destination IP Address | Token Bucket ID | Token ID |
|---|---|---|---|---|
| 443 (TCP port number of HTTPS packet) | IP11 | IP12 | 0 or the ID of the first token bucket | 0 |

The token bucket identification (ID) shown in table 1 is used to record the ID of a token bucket from which a token is obtained, and the initial value of the token bucket ID may be 0 or the ID of the first token bucket. The token ID is used to record the ID of the obtained token and the initial value of the token ID may be 0. When the token ID is 0, it indicates that no token is obtained for a user session corresponding to the entry.

In an example, an obtaining tag may also be set in table 1 to indicate whether a token is already obtained for the user session corresponding to this entry. The initial value of the obtaining tag may be set as a value indicating that no token is obtained for the corresponding user session.

At block S104, it may be determined whether a token is already obtained for the user session corresponding to the non-online user session entry. If no token is obtained, block S105 is executed. If a token is already obtained, block S109 is executed.

Whether a token is already obtained for the user session corresponding to the non-online user session entry may be determined in a first manner or a second manner as follows:

In the first manner, if the token ID in this entry is the initial value, it is determined that no token is obtained for the user session corresponding to this entry; otherwise, it is determined that a token is already obtained for the user session corresponding to this entry.

In the second manner, it may be determined whether a token is already obtained for the user session corresponding to this entry based on the obtaining tag in this entry.

At block S105, a token may be obtained from the first token bucket.

At block S106, it may be determined whether the token is obtained successfully. If yes, block S107 is executed; otherwise, block S108 is executed.

If there is still a token remained in the first token bucket, a token may be successfully obtained from the first token bucket. Otherwise, if there is none token remained in the first token bucket, no token can be obtained from the first token bucket.

At block S107, the HTTPS packet may be sent to the CPU for processing and the token ID in the non-online user session entry may be updated to the ID of the obtained token, and then the flow is quit.

At block S107, if the token bucket ID in the non-online user session entry is 0, the token bucket ID may be updated to the ID of the first token bucket. If this entry also contains an obtaining tag, the obtaining tag may be updated to a value indicating that a token is already obtained for the corresponding user session.

At block S108, the HTTPS packet may be abandoned, and then the flow is quit.

At block S109, the HTTPS packet may be sent to the CPU for processing, and then the flow is quit.

In a TCP spoofing process based on an HTTPS, every time that the access gateway device receives an HTTPS packet from the user host, the packet may be processed by the method as shown in FIG. 1. Subsequently, if a user passes Portal Authentication and goes online, the non-online user session entries with the source IP addresses being the IP address IP11 of the user host may be deleted to release the tokens obtained for the user sessions corresponding to these entries, and the released tokens may be then returned to the first token bucket.

In addition, when an non-online user session entry is configured at block S103, a corresponding timer may also be started in such a way that the timer may start timing. When the elapsed time of the timer reaches predetermined aging time T and the user is still not online, if a token is already obtained for the user session corresponding to this entry, the token may be released and then returned to the first token bucket, and the token ID in this entry may be set to the initial value and the timer may be restarted in such a way that the timer can restart timing. Additionally, when this entry contains an obtaining tag, the obtaining tag may also be updated to a value indicating that no token is obtained for the corresponding user session. Thus, when an HTTPS packet corresponding to the user session is received subsequently, a token is to be obtained again. In this case, as described in the following table 2, an non-online user session entry may also include an aging time T.

Figure 2:
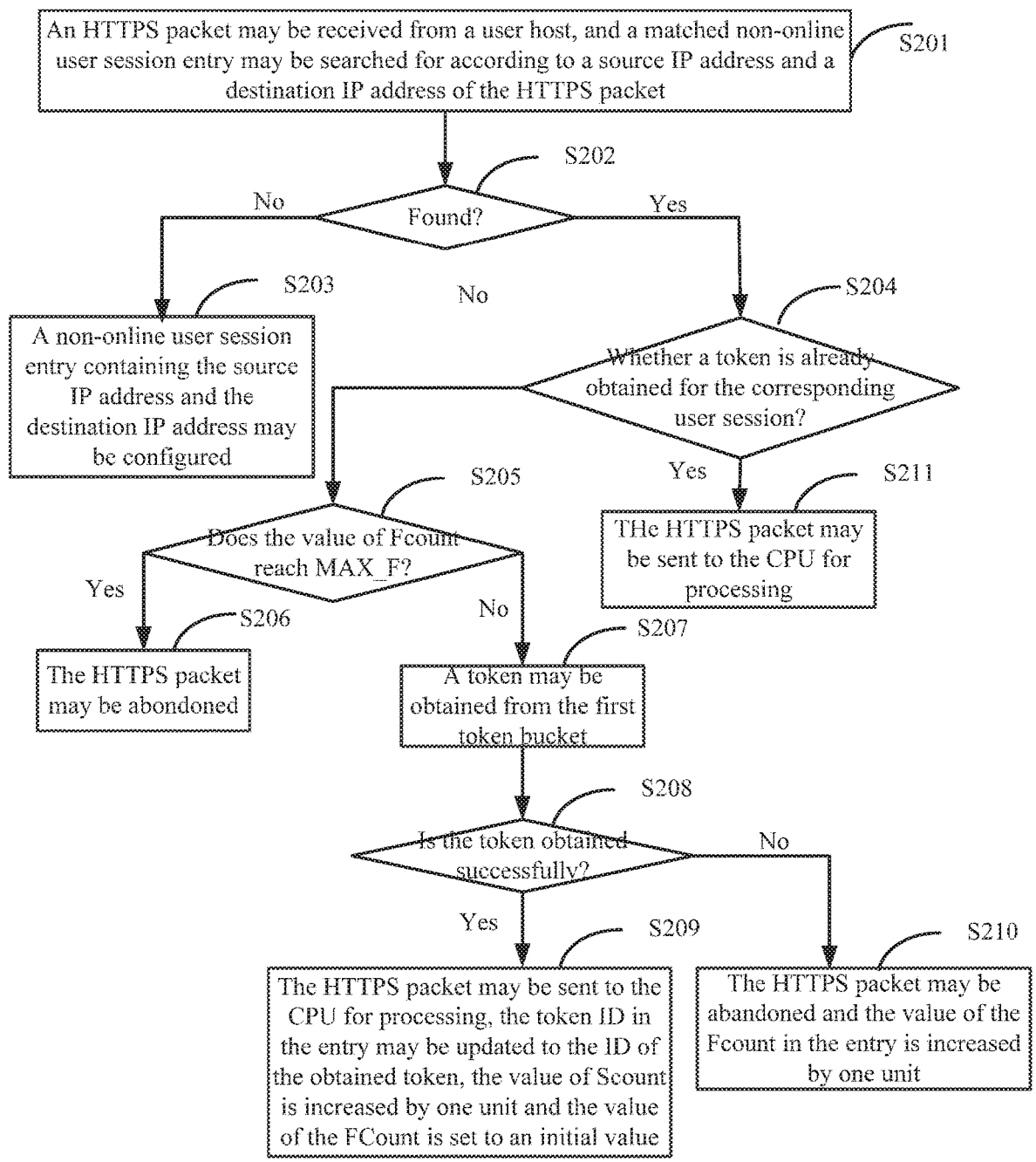
FIG. 2 is a flowchart illustrating a method of processing a packet according to another example of the present disclosure.

In another example, a first token bucket and a second token bucket may be preset. The number of tokens in the first token bucket may be set based on processing capability of a CPU of an access gateway device. The larger the processing capability of the CPU is, the more tokens the first token bucket may contain. But, the number of tokens in the second token bucket is so small as to be far less than the number of tokens in the first token bucket. A specific number of tokens in the second token bucket may be preset according to actual situations. The first token bucket may be used to restrict the number of normal non-online user sessions and the second token bucket may be used to restrict the number of abnormal non-online user sessions. As shown in FIG. 2, the method of processing a packet executed by the access gateway device may include the following blocks.

At block S201, an HTTPS packet may be received from a user host, and a matched non-online user session entry may be searched for according to a source IP address and a destination IP address of the HTTPS packet.

In an example of the present disclosure, a user session may be identified by a source IP address and a destination IP address, and one non-online user session entry corresponds to one user session.

At block S202, it may be determined whether the matched non-online user session entry is found. If no, block S203 is executed. If yes, block S204 is executed.

At block S203, a non-online user session entry containing the source IP address and the destination IP address may be configured, and then the flow is quit.

Assuming that the source IP address of the HTTPS packet received at block S201 is IP11 and the destination IP address thereof is IP12, the non-online user session entry configured at block S203 may be as shown in table 2:

TABLE 2

| Destination Port Number | Source IP Address | Destination IP Address | Token Bucket ID | Token ID | SCount | FCount | Aging Time |
|---|---|---|---|---|---|---|---|
| 443 | IP11 | IP12 | 0 or the ID of the first token bucket | 0 | 0 | 0 | T |

The token bucket ID in table 2 is used to record an ID of a token bucket from which a token is obtained and the initial value of the token bucket ID may be 0 or the ID of the first token bucket.

The token ID is used to record the ID of the obtained token and the initial value of the token ID may be 0. When the token ID is 0, it indicates that no token is obtained for the user session corresponding to this entry.

The SCount is used to record the number of times that a token is obtained successfully. The value of the SCount may be increased by one unit every time a token is obtained. For example, the value of the Scount may be added by 1. Besides, the value of the FCount may be set to an initial value, where the initial values of both SCount and FCount may be 0.

FCount is used to record the number of times that a token has failed to be obtained continuously over an aging time T. The value of the FCount may be increased by one unit every time a token has failed to be obtained. For example, the value of the Fcount may be added by 1.

Aging time T: when the non-online user session entry as shown in table 2 is configured, a timer may be started, where the total timing length of the timer is equal to a predetermined aging time T. When the elapsed time of the timer reaches T, the token obtained for the user session corresponding to the entry may be released, the token ID may be set to an initial value and the value of the FCount may also be set to an initial value.

For example, an obtaining tag may also be set in table 2 to indicate whether a token is already obtained for the user session corresponding to this entry. The initial value of the obtaining tag may be set to a value indicating that no token is obtained for the corresponding user session.

At block S204, it may be determined whether a token is already obtained for the user session corresponding to the non-online user session entry. If no token is obtained, block S205 is executed. If a token is already obtained, block S211 is executed.

Whether a token is already obtained for a user session corresponding to an non-online user session entry may be determined in the above first manner or the above second manner, which will not be redundantly described herein.

At block S205, it may be determined whether the value of the FCount in the non-online user session entry reaches a predetermined threshold MAX_F. If yes, block S206 is executed; otherwise, block S207 is executed.

At block S206, the HTTPS packet may be abandoned, and then the flow is quit.

At block S207, a token may be obtained from the first token bucket.

At block S208, it may be determined whether the token is obtained successfully. If yes, block S209 is executed; otherwise, block S210 is executed.

If there is still a token remained in the first token bucket, a token may be successfully obtained from the first token bucket. Otherwise, if there is none token remained in the first token bucket, no token can be obtained from the first token bucket.

At block S209, the HTTPS packet may be sent to a CPU for processing, and the token ID in the non-online user session entry may be updated to the ID of the obtained token, the value of the SCount may be increased by one unit and the value of the FCount may be set to the initial value. Afterwards, the flow is quit.

At block S209, if the token bucket ID in the non-online user session entry is 0, the token bucket ID may be updated to the ID of the first token bucket. If this entry also contains an obtaining tag, the obtaining tag may be updated to a value indicating that a token is already obtained for the corresponding user session.

At block S210, the HTTPS packet may be abandoned and the value of the FCount in the non-online user session entry may be increased by one unit, and then the flow is quit.

At block S210, if the token bucket ID in the non-online user session entry is 0, the token bucket ID may be updated to the ID of the first token bucket.

At block S211, the HTTPS packet may be sent to the CPU for processing, and then the flow is quit.

In addition, according to a method of an example of the present disclosure, when it is detected that the value of the SCount in an non-online user session entry reaches a predetermined first threshold MAX_S1, the user session corresponding to this entry may be regarded as an abnormal non-online user session and the token bucket from which a token is obtained is modified into a second token bucket from a first token bucket. For example, the token bucket ID in the non-online user session entry may be modified into the ID of the second token bucket. In this way, a token will be obtained from the second token bucket as shown at block S207 in FIG. 2. Subsequently, if the value of the SCount in this entry continuously increases, when it is detected that the value of the SCount reaches a predetermined second threshold MAX_S2, this entry may be deleted to release the token obtained for the user session corresponding to this entry and the released token may be returned to the second token bucket, where MAX_S2 is greater than MAX_S1.

If a user passes a Portal authentication and goes online, the non-online user session entries with source IP addresses being an IP address IP11 of a user host will be deleted to release the tokens obtained for the user sessions corresponding to these entries.

In addition, when an non-online user session entry is configured at block S203, a timer may also be started in such a way that the timer can start timing. When the elapsed time of the timer reaches predetermined aging time T and the user is still be non-online, if a token is already obtained for the user session corresponding to this entry, the token may be released and then returned to the corresponding token bucket. Then, the token ID in this entry may be set to an initial value, and the value of the FCount in this entry may be set to an initial value as well. The timer may restarted in such a way that the timer can restart timing. Additionally, when this entry contains an obtaining tag, the obtaining tag may also be updated to a value indicating that no token is obtained for the corresponding user session. Thus, a token is to be subsequently obtained again for a HTTPS packet corresponding to the user session.

In a practical application scenario, after a user host is powered on, a large number of programs installed on the user host may automatically send HTTPS packets to request for connecting to a server. However, a user will not input a user name and a password because the user does not need to use such programs, and therefore, the Portal authentication cannot be accomplished. Thus, such programs will continue to send HTTPS packets to request for connecting to a server. In this case, the HTTPS packets sent by the user host may bring attacks to an access gateway device. According to the method as shown in FIG. 2, a first token bucket for restricting a number of normal non-online user sessions and a second token bucket for restricting a number of abnormal non-online user sessions are provided. If a user is still non-online when the number of times that a token is obtained for a user session reaches MAX_S1, it is regarded that the user session is an abnormal non-online user session and the HTTPS packet of the session is an attack packet. Thus, a token for the abnormal non-online user session is restricted to be obtained only from the second token bucket containing a very small number of tokens, thereby further restricting the number of the abnormal non-online user sessions.

Apparently, three or more token buckets may be set so as to achieve more precise traffic restriction. Taking three token buckets for example, a third token bucket may also be set in addition to the above first and second token buckets. The number of tokens in the third token bucket may be a predetermined percentage of that in the first token bucket, for example, 40% of the number of tokens in the first token bucket. Initially, a token may be obtained from the first token bucket. When it is detected that the CPU load of an access gateway device goes beyond a predetermined load threshold, the token bucket from which a token is obtained may be modified from the first token bucket into the third token bucket, so that a token can be obtained from the third token bucket. Subsequently, when it is detected that the value of the SCount in an non-online user session entry reaches MAX_S1, the token bucket from which a token is obtained may be modified from the third token bucket to the second token bucket, so that a token can be obtained from the second token bucket.

The method of processing a packet as shown in FIG. 2 will be described below in detail with a specific example. In this example, two token buckets may be created at a forwarding plane of underlying hardware of an access gateway device, including a first token bucket with the token bucket ID as bucket21 and a second token bucket with the token bucket ID as bucket22. The number of tokens in the first token bucket may be set based on processing capability of a CPU of the access gateway device. The number of tokens in the second token bucket is very small.

The following 4 rules may be fixedly distributed via a port with enabled Portal function on an access gateway device.

Rule 1 is an authentication-free rule, which is used to define that HTTP/HTTPS packets with destination IP addresses being IP addresses of a Portal server or some authentication-free Web servers may be directly forwarded.

Rule 2 is used to define that an HTTP packet with a destination port number as 80 is redirected to a CPU.

Rule 3 is used to define that an HTTPS packet with a destination port number as 443 is redirected to a CPU.

Rule 4 is used to define that packets which do not hit the above Rule 1, Rule 2 and Rule 3 are abandoned.

Figure 3:
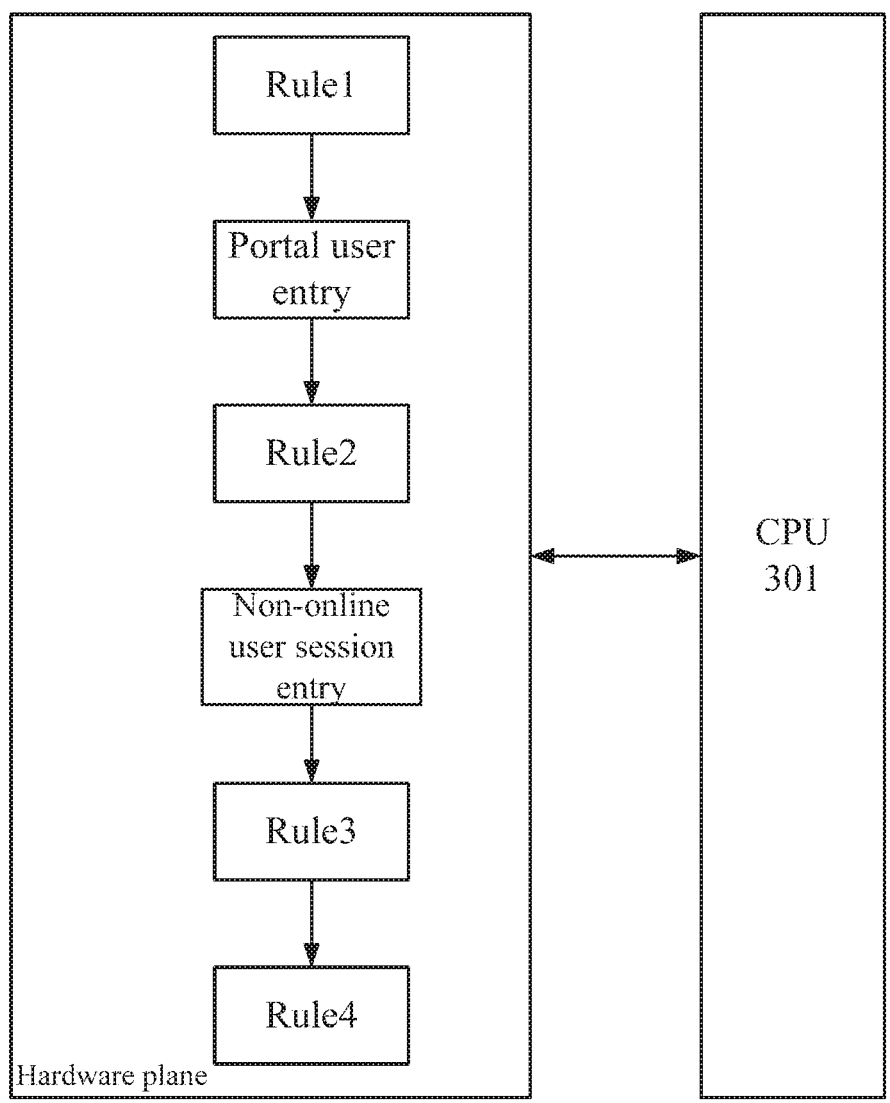
FIG. 3 is a schematic diagram illustrating how to perform matching of an HTTPS packet at a hardware plane according to an example of the present disclosure.

If a user passes Portal authentication, a Portal user entry may be distributed. The Portal user entry is between the Rule 1 and the Rule 2 in a matching sequence. Subsequently, an HTTP/HTTPS packet sent by a user host will be forwarded according to the Portal user entry. In an example of the present disclosure, an added non-online user session entry which is between the Rule 2 and the Rule 3 in a matching sequence is used to restrict the number of HTTPS packets of non-online user hosts, thereby ensuring that the actual load of the CPU (301) may not go beyond the normal processing capability and protecting the CPU against attacks. The matching sequence of the Rule 1, the Portal user entry, the Rule 2, the non-online user session entry, the Rule 3, the Rule 4 is as shown in FIG. 3. FIG. 3 just schematically illustrates the matching sequence of each entry at a hardware plane which is not limited herein.

In a first case, a first HTTPS packet of an non-online user session is received.

It is assumed that the HTTPS packet includes a source IP address as 10.0.0.2, a destination IP address as https:// 100.1.1.2 and a destination port number as 443.

After receiving an HTTPS packet at a hardware plane, an access gateway device may match the HTTPS packet with the Rule 1, the Portal user entry, the Rule 2 and the non-online user session entry, respectively, but none of the Rules is hit. Then, the HTTPS packet may be continuously matched with the Rule 3 and the result is that the rule 3 is hit. The HTTPS packet may then be sent to a CPU. The CPU may distribute an non-online user session entry as shown in table 3-1 at the hardware plane, where the entry is between the Rule 2 and the Rule 3 in a matching sequence.

TABLE 3-1

| Destination Port Number | Source IP Address | Destination IP Address | Token Bucket ID | Token ID | SCount | FCount | Aging Time |
|---|---|---|---|---|---|---|---|
| 443 | 10.0.0.2 | 100.1.1.2 | bucket21 | 0 | 0 | 0 | T |

In a second case, a second HTTPS packet of the non-online user session entry may be received.

After receiving the second HTTPS packet at the hardware plane, the access gateway device may match the HTTPS packet with the Rule 1, the Portal user entry and the Rule 2, respectively, and none of the Rules is hit. Then, the access gateway device may continuously match the HTTPS packet with locally stored non-online user session entries and the entry as shown in table 3-1 is hit. It is determined that no token is obtained for the user session corresponding to the entry based on that the token ID in the entry is 0. Then, a token may be obtained from the first token bucket, i.e., the bucket21. If the token is obtained successfully, for example, a token with ID as 100 is obtained, the token ID in the entry may be updated to 100, the value of the SCount may be added by 1 and the value of the FCount is cleared to zero. The HTTPS packet may be continuously matched with the Rule 3 and the HTTPS packet may be sent to the CPU for processing according to the Rule 3. In this case, table 3-1 is updated as shown in table 3-2.

TABLE 3-2

| Destination Port Number | Source IP Address | Destination IP Address | Token Bucket ID | Token ID | SCount | FCount | Aging Time |
|---|---|---|---|---|---|---|---|
| 443 | 10.0.0.2 | 100.1.1.2 | bucket 21 | 100 | 1 | 0 | T |

If the token has failed to be obtained, the HTTPS packet may be abandoned and the value of the Fcount may be added by 1. In this case, table 3-1 is updated as shown in table 3-3.

TABLE 3-3

| Destination Port Number | Source IP Address | Destination IP Address | Token Bucket ID | Token ID | SCount | FCount | Aging Time |
|---|---|---|---|---|---|---|---|
| 443 | 10.0.0.2 | 100.1.1.2 | bucket 21 | 0 | 0 | 1 | T |

In a third case, a subsequent HTTPS packet of the non-online user session entry may be received.

If the token is obtained successfully in the second case, after a subsequent HTTPS packet is received at a hardware plane, the HTTPS packet may be matched with the Rule 1, the Portal user entry and the Rule 2, respectively, but none of the Rules is hit. Then, the HTTPS packet may be continuously matched with locally stored non-online user session entries and the entry as shown in table 3-2 is hit. It is determined that a token is already obtained for the user session corresponding to the entry based on that the token ID in the entry is not 0. Thus, the HTTPS packet may be continuously matched with the Rule 3 and the HTTPS packet may be then sent to the CPU for processing according to the Rule 3. In this case, the non-online user session entry as shown in table 3-2 will not be updated.

Thus, after the completion of a TCP spoofing process based on an HTTPS, Portal authentication may be carried out for a user. After passing the authentication, the user can go online. Then, a CPU may distribute a Portal user entry to a hardware plane and notify the hardware plane to delete the non-online user session entries with the source IP addresses as 10.0.0.2 so as to release the tokens obtained for the user sessions corresponding to these entries and return them to the token bucket.

If the token has failed to be obtained in the second case, after the hardware plane receives a subsequent HTTPS packet, the HTTPS packet may be matched with the Rule 1, the Portal user entry and the Rule 2, respectively, but none of the Rules is hit. Then, the HTTPS packet may be continuously matched with locally stored non-online user session entries and the entry as shown in table 3-3 is hit. It is determined that no token is obtained for the user session corresponding to the entry based on that the token ID in the entry is 0. Thus, a token may be obtained from the first token bucket, i.e., the bucket21. When the token is obtained successfully, for example, a token with ID as 100 is obtained, the token ID in the entry may be updated to 100, the value of the SCount may be added by 1 and the value of the FCount may be cleared to zero. The HTTPS packet may be continuously matched with the Rule 3 and the HTTPS packet may be then sent to the CPU for processing according to the Rule 3. In this case, table 3-3 is updated as shown in table 3-2. If a token fails to be obtained again, the HTTPS packet may be abandoned and the value of the Fcount may be added by 1. In this case, table 3-3 is updated as shown in table 3-4.

TABLE 3-4

| Destination Port Number | Source IP Address | Destination IP Address | Token Bucket ID | Token ID | SCount | FCount | Aging Time |
|---|---|---|---|---|---|---|---|
| 443 | 10.0.0.2 | 100.1.1.2 | Bucket 21 | 0 | 0 | 2 | T |

In a fourth case, an non-online user session entry expires.

When the elapsed time of a timer corresponding to an non-online user session entry reaches a time T, the token obtained for the user session corresponding to the entry may be released and then returned to the first token bucket, i.e., bucket21. Moreover, the token ID may be set to 0 and the value of the FCount may be cleared to 0. But the value of the SCount may remain unchanged. A token is to be obtained again for a subsequent HTTPS packet.

In a fifth case, a user has not been online during a plurality of Ts.

If a user cannot go online during a plurality of Ts, the value of the SCount in the non-online user session entry may be continuously accumulated. When it is detected the value of the SCount reaches MAX_S1, a token for the user session corresponding to the entry is restricted to be obtained only from the second token bucket, i.e., the bucket 22, and the token bucket ID in the non-online user session entry is modified into bucket22. Since the number of tokens in the second token bucket, i.e., the bucket22, is very small, the purpose of restricting an abnormal user from going online may be achieved.

Subsequently, when it is detected the value of the SCount reaches MAX_S2, the non-online user session entry may be deleted, wherein MAX_S2 is greater than MAX_S1.

In a sixth case, a user cannot go on-line during one T.

If a token cannot be obtained in one T time, the value of the FCount will be continuously accumulated. After an HTTPS packet is received, a token is not allowed to be obtained for the user session corresponding to the entry and the HTTPS packet is directly abandoned if the value of the FCount in the matched non-online user session entry reaches MAX_F. Subsequently, when the elapsed time of the timer reaches T, a token may be allowed to be obtained for the user session corresponding to the entry only after the value of the FCount is cleared to 0.

Corresponding to the foregoing examples of the method of processing a packet, the present disclosure also provides an example of a device for processing a packet.

The example of the device for processing a packet in the present disclosure may be applied to an access gateway device. The device example may be implemented by software, and may also be implemented by hardware or a combination of software and hardware.

Figure 4:
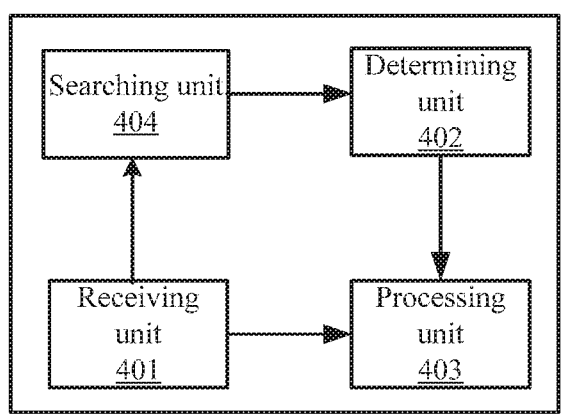
FIG. 4 is a schematic diagram illustrating a structure of an access gateway device where an apparatus for processing a packet is located according to an example of the present disclosure.

Referring to FIG. 4, an access gateway device 40 in an example of the present disclosure may include the following units: a receiving unit 401, a determining unit 402, a processing unit 403 and a searching unit 404.

The receiving unit 401 may be configured to receive an HTTPS packet from a user host.

The searching unit 404 may be configured to search for an non-online user session entry matching the HTTPS packet according to a source IP address and a destination IP address of the HTTPS packet after the receiving unit 401 receives the HTTPS packet.

The determining unit 402 may be configured to determine whether a token has already been obtained for a user session corresponding to the non-online user session entry when the searching unit 404 finds the non-online user session entry.

The processing unit 403 may be configured to obtain a token from a first token bucket if the determining unit 402 determines that no token is obtained for the user session corresponding to the non-online user session entry, where the number of tokens in the first token bucket is set based on processing capability of a CPU of the access gateway device. The HTTPS packet may be sent to the CPU for processing when the token is successfully obtained and abandoned when the token has failed to be obtained.

Figure 5:
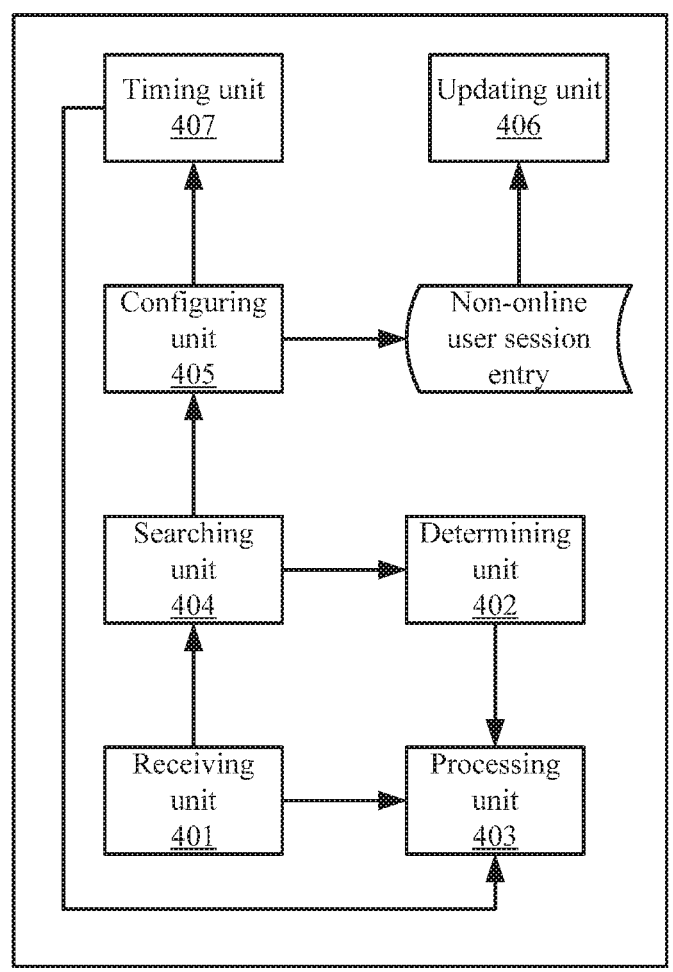
FIG. 5 is a schematic diagram illustrating a structure of an access gateway device according to an example of the present disclosure.

As shown in FIG. 5, the access gateway device 40 may also include a configuring unit 405.

The configuring unit 405 may be configured to configure an non-online user session entry containing the source IP address and the destination IP address if the searching unit 404 does not find the non-online user session entry matching the HTTPS packet.

The processing unit 403 may also be configured to send the HTTPS packet to the CPU for processing if the determining unit 402 determines that a token has been already obtained for the user session corresponding to the non-online user session entry.

The processing unit 403 may also be configured to update a token ID in the non-online user session entry to an ID of the obtained token every time the token is obtained successfully.

The determining unit 402 may be configured to determine whether a token has already been obtained for the user session corresponding to the non-online user session entry in the following manner: determining that no token is obtained for the user session corresponding to the non-online user session entry when the token ID in the non-online user session entry is an initial value; otherwise, determining that a token has already been obtained for the user session corresponding to the non-online user session entry.

The processing unit 403 may also be configured to: every time when the token is obtained successfully, increase the value of SCount in the non-online user session entry by one unit, wherein the SCount indicates the number of times that a token is successfully obtained, and set the value of the Fcount indicating the number of times that no token is obtained to an initial value; and every time when the token has failed to be obtained, increase the value of the FCount in the non-online user session entry by one unit.

As shown in FIG. 5, the access gateway device 40 may also include: an updating unit 406.

The updating unit 406 may be configured to modify the first token bucket into a second token bucket when detecting that the value of the SCount in the non-online user session entry reaches a predetermined first threshold, where the number of tokens in the second token bucket is far less than the number of tokens in the first token bucket; and delete the non-online user session entry when detecting that the value of the SCount in the non-online user session entry reaches a predetermined second threshold, where the second threshold is greater than the first threshold.

The processing unit 403 is also configured to abandon the HTTPS packet when the determining unit 402 determines that the value of the FCount in the non-online user session entry reaches a predetermined threshold.

As shown in FIG. 5, the access gateway device 40 may also include:

a timing unit 407 configured to start a timer corresponding to the non-online user session entry for timing when configuring the non-online user session entry and restart the timer when the elapsed time of the timer reaches a predetermined aging time.

The processing unit 403 is also configured to, in the case that a token has already been obtained for the user session corresponding to the non-online user session entry when an elapsed time of the timer reaches predetermined aging time, update the non-online user session entry to a status that no token is obtained for the corresponding user session and set the value of the FCount in the non-online user session entry to an initial value.

Figure 6:
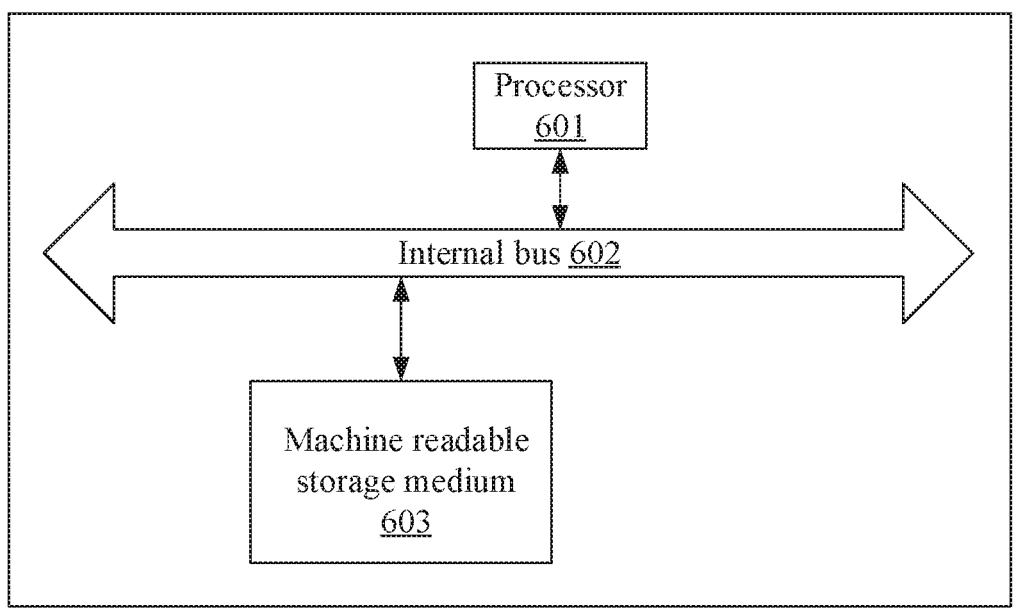
FIG. 6 is a schematic diagram illustrating another structure of an access gateway device according to an example of the present disclosure.

FIG. 6 is a schematic diagram illustrating another structure of an access gateway device according to an example of the present disclosure. The access gateway device incudes: a processor 601, and a machine-readable storage medium 602 that stores machine-executable instructions. The processor 601 may communicate with the machine-readable storage medium 602 via a system bus 603. By reading and executing the machine-executable instructions on the machine-readable storage medium 602, the processor 601 may execute the above method of processing a packet.

The machine-readable storage medium 602 mentioned herein may be any electronic, magnetic, optical or other physical storage device, and may contain or store information, such as executable instructions, data and the like. For example, the machine-readable storage medium may be a Random Access Memory (RAM), a volatile memory, a nonvolatile memory, a flash memory, a storage drive (e.g., hard disk drive), a solid state disk, or any type of storage disk.

The machine-readable storage medium 602 may be configured to store program instructions run by the receiving unit 401, program instructions run by the determining unit 402, program instructions run by the processing unit 403, program instructions run by the searching unit 404, program instructions run by the configuring unit 405, program instructions run by the updating unit 406, and program instructions run by the timing unit 407.

The processor 601 is configured to execute the program instructions run by the receiving unit 401, the program instructions run by the determining unit 402, the program instructions run by the processing unit 403, the program instructions run by the searching unit 404, the program instructions run by the configuring unit 405, the program instructions run by the updating unit 406, and the program instructions run by the timing unit 407. The processor 601 may implement the above method of processing a packet by executing the program instructions run by the above different units.

In an example, by reading and executing the machine-executable instructions on the machine-readable storage medium 602, the processor 601 may be caused to: receive a Hyper Text Transfer Protocol over Secure Socket Layer (HTTPS) packet from a user host;
search for an non-online user session entry matching the HTTPS packet according to a source Internet Protocol (IP) address and a destination IP address of the HTTPS packet;
in the case that the non-online user session entry is found, obtain a token from a first token bucket when determining that a user session corresponding to the non-online user session entry has no token, wherein a number of tokens in the first token bucket is set based on processing capability of a CPU of the access gateway device;
send the HTTPS packet to the CPU for processing when the token is successfully obtained; and abandon the HTTPS packet when the token has failed to be obtained.

In the case that the non-online user session entry is not found, the processor 601 is also caused by the machine-executable instructions to:
configure a non-online user session entry containing the source IP address and the destination IP address.

The processor 601 is also caused by the machine-executable instructions to: send the HTTPS packet to the CPU for processing when determining that the user session corresponding to the non-online user session entry has a token.

The processor 601 is also caused by the machine-executable instructions to: update a token identification (ID) in the non-online user session entry to an ID of the obtained token every time that the token is successfully obtained; and determine whether the user session corresponding to the non-online user session entry has a token in the following manner:
when the token ID in the non-online user session entry is an initial value,
determine that no token is obtained for the user session corresponding to the non-online user session entry;
otherwise,
determine that a token has been already obtained for the user session corresponding to the non-online user session entry.

The processor 601 is also caused by the machine-executable instructions to:
every time when a token is successfully obtained,
increase a value of SCount in the non-online user session entry by one unit, wherein the SCount indicates a number of times that a token is successfully obtained, and
set a value of FCount in the non-online user session entry to an initial value, wherein the FCount indicates a number of times that a token has failed to be obtained; and
every time when a token has failed to be obtained,
increase the value of the FCount in the non-online user session entry by one unit.

The processor 601 is also caused by the machine-executable instructions to:
modify the first token bucket into a second token bucket when detecting that the value of the SCount in the non-online user session entry reaches a predetermined first threshold, wherein the number of tokens in the second token bucket is far less than the number of tokens in the first token bucket; and
delete the non-online user session entry when detecting that the value of the SCount in the non-online user session entry reaches a predetermined second threshold, wherein the second threshold is greater than the first threshold.

The processor 601 is also caused by the machine-executable instructions to:
abandon the HTTPS packet when determining that the value of the FCount in the non-online user session entry reaches a predetermined threshold.

When configuring the non-online user session entry, the processor 601 is also caused by the machine-executable instructions to:
start a timer corresponding to the non-online user session entry for timing; and
in the case that a token has already been obtained for the user session corresponding to the non-online user session entry when an elapsed time of the timer reaches a predetermined aging time,
update the non-online user session entry to a status that no token is obtained for the corresponding session,
set the value of the FCount in the non-online user session entry to an initial value, and restart the timer.

Details of the implementation process of the functions and effects of different units in the above device may be seen from the implementation process of corresponding blocks in the above method, which will not be redundantly described herein.

Since the device examples substantially correspond to the method examples, a reference may be made to part of the descriptions of the method examples for the related part. The device examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the examples. Those of ordinary skill in the art may understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed descriptions of a method and a device provided according to the examples of the present disclosure. Specific examples are used herein to set forth the principles and the implementing methods of the present disclosure, and the descriptions of the above examples are only meant to help understanding of the method and the core idea of the present disclosure. Meanwhile, those of ordinary skill in the art may make alterations to the specific examples and the scope of application in accordance with the idea of the present disclosure. In conclusion, the contents of the present specification shall not be interpreted as limiting to the present disclosure.

The invention claimed is:

1. A method of processing a packet, comprising:
receiving, by an access gateway device, a Hyper Text Transfer Protocol over Secure Socket Layer (HTTPS) packet from a user host;
searching, by the access gateway device, for a non-online user session entry matching the HTTPS packet according to a source Internet Protocol (IP) address and a destination IP address of the HTTPS packet;
in case that the non-online user session entry is found,
obtaining, by the access gateway device, a token from a first token bucket when determining that a user session corresponding to the non-online user session entry has no token, wherein a number of tokens in the first token bucket is set based on processing capability of a CPU of the access gateway device;
sending, by the access gateway device, the HTTPS packet to the CPU to be processed in response to successfully obtaining the token; and
abandoning, by the access gateway device, the HTTPS packet in response to not successfully obtaining the token,
wherein determining whether the user session corresponding to the non-online user session entry has a token in the following manner:
when the token ID in the non-online user session entry is an initial value,
determining, by the access gateway device, that no token has been obtained for the user session corresponding to the non-online user session entry;
otherwise,
determining, by the access gateway device, that a token has been already obtained for the user session corresponding to the non-online user session entry.

2. The method according to claim 1, wherein, in case that the non-online user session entry is not found, further comprising:
configuring, by the access gateway device, a non-online user session entry containing the source IP address and the destination IP address.

3. The method according to claim 2, wherein configuring the non-online user session entry comprises:
starting a timer corresponding to the non-online user session entry for timing; and
in case that a token has already been obtained for the user session corresponding to the non-online user session entry when an elapsed time of the timer reaches a predetermined aging time,
updating, by the access gateway device, the non-online user session entry to a status that no token is obtained for the corresponding user session,
setting, by the access gateway device, the value of the FCount in the non-online user session entry to an initial value, and
restarting, by the access gateway device, the timer.

4. The method according to claim 1, further comprising:
sending, by the access gateway device, the HTTPS packet to the CPU to be processed when determining that the user session corresponding to the non-online user session entry has a token.

5. The method according to claim 1, wherein
every time when a token is successfully obtained,
updating, by the access gateway device, a token identification (ID) in the non-online user session entry with an ID of the obtained token.

6. The method according to claim 1, wherein
every time when a token is successfully obtained,
increasing, by the access gateway device, a value of SCount in the non-online user session entry by one unit, wherein the SCount indicates a number of times that a token is successfully obtained, and
setting, by the access gateway device, a value of FCount in the non-online user session entry to an initial value, wherein the FCount indicates a number of times that a token is not successfully obtained; and
every time when a token is not successfully obtained,
increasing, by the access gateway device, the value of the FCount in the non-online user session entry by one unit.

7. The method according to claim 6, further comprising:
modifying, by the access gateway device, the first token bucket into a second token bucket when detecting that the value of the SCount in the non-online user session entry reaches a predetermined first threshold, wherein the number of tokens in the second token bucket is far less than the number of tokens in the first token bucket; and
deleting, by the access gateway device, the non-online user session entry when detecting that the value of the SCount in the non-online user session entry reaches a predetermined second threshold, wherein the second threshold is greater than the first threshold.

8. The method according to claim 6, further comprising:
abandoning, by the access gateway device, the HTTPS packet when determining that the value of the FCount in the non-online user session entry reaches a predetermined threshold.

9. An access gateway device, comprising:
a processor; and
a non-transitory machine readable storage medium storing machine-executable instructions, wherein by reading and executing the machine-executable instructions, the processor is caused to:
receive a Hyper Text Transfer Protocol over Secure Socket Layer (HTTPS) packet from a user host;
search for a non-online user session entry matching the HTTPS packet according to a source Internet Protocol (IP) address and a destination IP address of the HTTPS packet;
in case that the non-online user session entry is found,
obtain a token from a first token bucket when determining that a user session corresponding to the non-online user session entry has no token, wherein a number of tokens in the first token bucket is set based on processing capability of a CPU of the access gateway device;
send the HTTPS packet to the CPU to be processed in response to successfully obtaining the token; and
abandon the HTTPS packet in response to not successfully obtaining the token,
wherein the processor is further caused by the machine-executable instructions to determine whether the user session corresponding to the non-online user session entry has a token in the following manner:
when the token ID in the non-online user session entry is an initial value,
determining, by the access gateway device, that no token has been obtained for the user session corresponding to the non-online user session entry;

otherwise, determining, by the access gateway device, that a token has been already obtained for the user session corresponding to the non-online user session entry.

10. The device according to claim 9, wherein in case that the non-online user session entry is not found, the processor is further caused by the machine-executable instructions to:

configure a non-online user session entry containing the source IP address and the destination IP address.

11. The device according to claim 9, wherein the processor is further caused by the machine-executable instructions to:

send the HTTPS packet to the CPU to be processed when determining that the user session corresponding to the non-online user session entry has a token.

12. The device according to claim 9, wherein the processor is further caused by the machine-executable instructions to:

every time when a token is successfully obtained,
update a token identification (ID) in the non-online user session entry with an ID of the obtained token.

13. The device according to claim 9, wherein the processor is further caused by the machine-executable instructions to:

every time when a token is successfully obtained,
increase a value of SCount in the non-online user session entry by one unit, wherein the SCount indicates a number of times that a token is successfully obtained, and set a value of FCount in the non-online user session entry to an initial value, wherein the FCount indicates a number of times that a token is not successfully obtained; and every time when a token is not successfully obtained,
increase the value of the FCount in the non-online user session entry by one unit.

14. The device according to claim 13, wherein the processor is further caused by the machine-executable instructions to:

the access gateway device modifies the first token bucket into a second token bucket when detecting that the value of the SCount in the non-online user session entry reaches a predetermined first threshold, wherein the number of tokens in the second token bucket is far less than the number of tokens in the first token bucket; and the access gateway device deletes the non-online user session entry when detecting that the value of the SCount in the non-online user session entry reaches a predetermined second threshold, wherein the second threshold is greater than the first threshold.

15. The device according to claim 13, wherein the processor is further caused by the machine-executable instructions to:

abandon the HTTPS packet when determining that the value of the FCount in the non-online user session entry reaches a predetermined threshold.

\* \* \* \* \*